United States Patent
Nemirovsky et al.

(10) Patent No.: US 6,798,963 B2
(45) Date of Patent: Sep. 28, 2004

(54) METHOD FOR THE METALLIZATION OF OPTICAL FIBERS

(75) Inventors: Yael Nemirovsky, Haifa (IL); Elena Sidorov, Haifa (IL); Victor Sidorov, Haifa (IL)

(73) Assignee: Bluebird Optical Mems Ltd., Isfiya (IL)

( * ) Notice: Subject to any disclaimer, the term of this patent is extended or adjusted under 35 U.S.C. 154(b) by 0 days.

(21) Appl. No.: 10/137,705

(22) Filed: May 3, 2002

(65) Prior Publication Data

US 2003/0206706 A1 Nov. 6, 2003

(51) Int. Cl.$^7$ .............................. G02B 6/02; C23C 14/00
(52) U.S. Cl. ....................... 385/128; 427/124; 427/197; 427/294; 427/304
(58) Field of Search ................................ 385/123–128; 427/161–163.2; 438/31, 32; 437/123–125, 197, 215, 217, 294, 304, 305

(56) References Cited

U.S. PATENT DOCUMENTS

| | | | | |
|---|---|---|---|---|
| 3,801,368 A | * | 4/1974 | Fusayama et al. | 427/131 |
| 4,592,932 A | * | 6/1986 | Biswas et al. | 427/163.2 |
| 5,485,536 A | * | 1/1996 | Islam | 385/31 |
| 6,355,301 B1 | * | 3/2002 | Miller | 427/163.2 |
| 6,733,186 B2 | * | 5/2004 | Pfleger | 385/75 |

FOREIGN PATENT DOCUMENTS

JP 57145044 A * 9/1982 ........... C03B/37/10

* cited by examiner

Primary Examiner—Brian Healy
Assistant Examiner—Sarah U Song
(74) Attorney, Agent, or Firm—Edward Langer; Shiboleth, Yisraeli, Roberts, Zisman & Co.

(57) ABSTRACT

An improved method for providing high-quality optical fiber metallization with the required length at the required location. The method enables metallized optical fibers to be soldered and connected to mechanical components while reducing the level of stress in the metal coatings and providing strong adhesion, good conductivity and connectivity. The advantage of the method is a combination of vacuum evaporation and electroless deposition for the optical fiber metallization. A strong adhesion of the metal layer is achieved by the use of an evaporated thin metal layer, comprising an adhesion layer and a seed layer. The stress reduction is achieved due to electroless deposition, which is adequately thick for subsequent soldering/welding or other applications. The method comprises preparation for evaporation, preparation of optical fibers, evaporation of the thin metal adhesion and seed layer on the optical fiber, electroless deposition of an adequately thick metal layer, and acceptance testing. Metallization of optical fibers at any location across the fiber (patterned metallization) additionally includes application of an organic masking layer to the fiber before the metallization process, metallization of the fiber according to the present invention and subsequent dissolution of the masking layer. The inventive method applies to any fiber, in particular to SM (Single Mode) fibers and to PM (Polarization Maintaining) fibers.

17 Claims, 7 Drawing Sheets

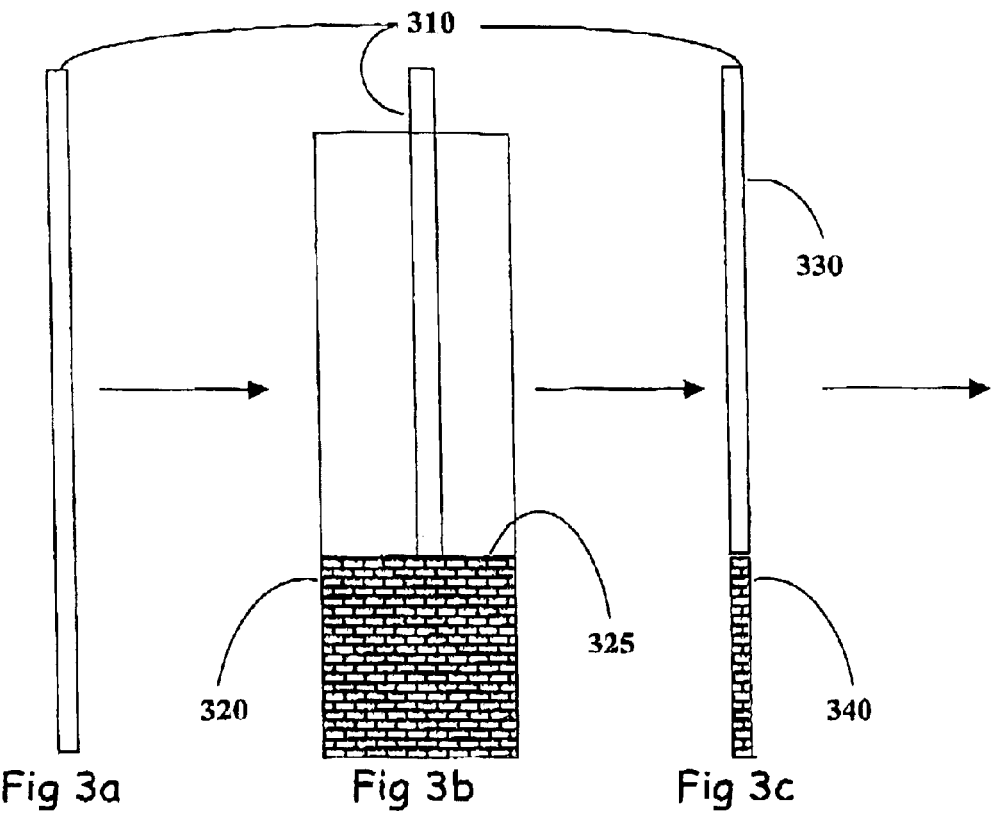
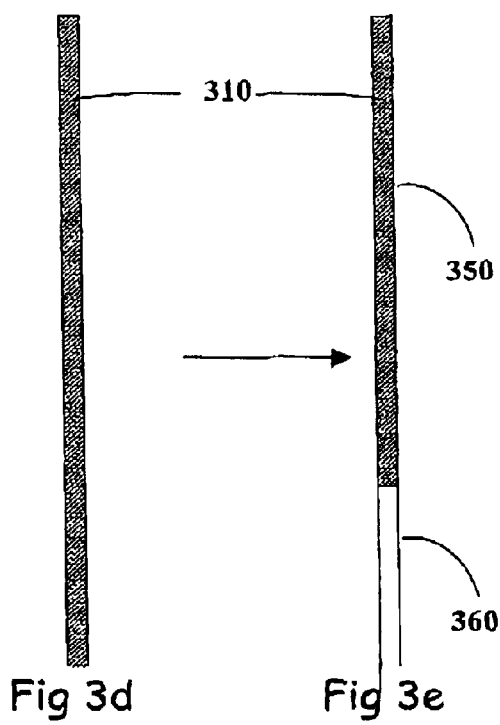
Fig 3a   Fig 3b   Fig 3c
Fig 3d   Fig 3e

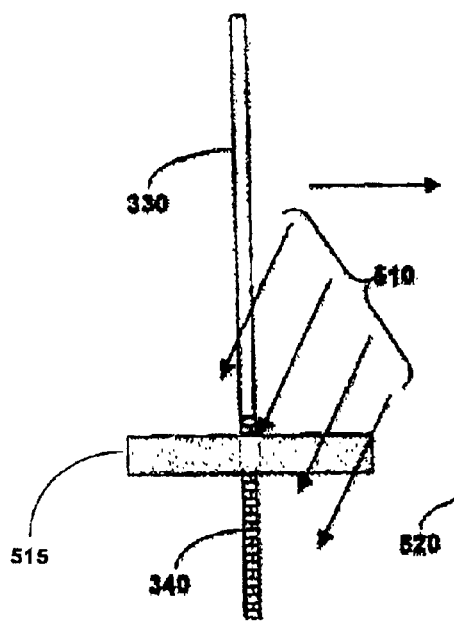 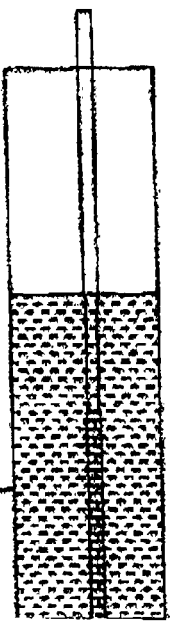 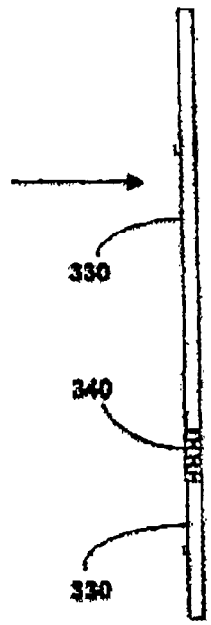
 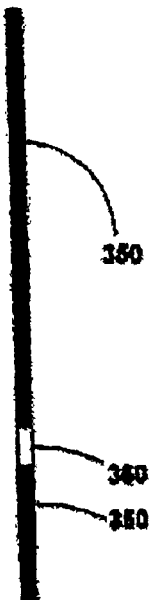
Fig. 5a Fig. 5b Fig. 5c
Fig. 5d Fig. 5e

METHOD FOR THE METALLIZATION OF OPTICAL FIBERS

FIELD OF THE INVENTION

The present invention generally relates to metallization of optical fibers, and more particularly, to an improved method for the metallization of an optical fiber using a combination of deposition by evaporation and immersion in an electroless solution,

BACKGROUND OF THE INVENTION

An optical fiber is a filament of transparent dielectric material, usually glass or plastic, and usually circular in cross section, that guides light. An optical fiber usually has a cylindrical core surrounded by, and in intimate contact with, a cladding of similar geometry. Cladding of optical fiber is a layer of material of lower refractive index, in intimate contact with the core material of higher refractive index. The refractive index of a medium is the ratio of the velocity of propagation of an electromagnetic wave in a vacuum to its velocity in the medium, Fiber-optic technology has many applications requiring the formation of a rigid, high-reliability bond to optical fibers at their ends or at mid-section locations. Bonding or soldering may be facilitated by the metallization of the optical fiber, thus providing a convenient and efficient material to which other components can be soldered using low-temperature solders. It is important that this metallization will not adversely affect the glass fiber or its optical or mechanical properties, as well as the level of stress in the coatings, while providing good connectivity and good conductivity.

A description of the prior art is now presented by reference to Filas, R. W., "Electroless Metallization of Silica Optical Fiber for Hermetic Packaging" in *ASME Advances in Electronic Packaging*, v. 1 (1997). In general, aqueous metal deposition and vacuum deposition are the processes of choice for metallization since these do not adversely affect the low heat tolerance of the polymer coatings usually applied to the glass fibers. The aqueous metal deposition is either based on electroplating or on an electroless process. The vacuum deposition is either based on sputtering or on evaporation. The latter is preferred since sputtering may introduce mechanical damage into the delicate fiber. A critical and comprehensive review of the various deposition processes is reported by Filas, R. W., "Metallization of Silica optical Fibers" in *MRS Symposium Proc.*, v. 531 (1998). In U.S. Pat. No. 5,959,595 (1999), Martin et al, disclose a conductive material having a core contacting surface coated with an adhesive material.

The key to the aqueous metal deposition process is a sensitization step using a stannous fluoride solution. Subsequent treatment includes immersion in a palladium chloride/HCl solution and commercially available electroless nickel and displacement gold solutions. U.S. Pat. No. 5,380,559 to Filas, et al, (1995) describes the electroless metallization of an optical fiber for hermetic packaging.

The prior art literature on the subject of electroless metallization describes the basic process of electroless deposition. The most common metals used are copper and nickel. The overall process comprises the steps of bare fiber surface preparation (such as stripping or cleaning), sensitization, activation, and electroless metal deposition. The main disadvantage is a use of sensitization and activation steps which provide adequate adhesion of metal layers only within a very narrow process window and hence, the process is problematic and adhesion may fail.

Strong adhesion can be provided by the use of vacuum evaporation technique, however, the main disadvantage of the evaporation process for fiber metallization is that the evaporated layers get highly stressed for sufficiently thick metal layers. So, it sets a limit to the metallized layers in terms of thickness. For example, evaporated nickel becomes stressed above a thickness of several thousands angstroms. The stressed nickel eventually cracks and peels-off. Thus, only thin metal layers can be deposited onto optical fiber by evaporation.

The main disadvantage of electroplating is that electroplating requires electrical contacts from the fiber to the power source, which also complicates the process. Furthermore, there is still the need to activate the surface before electroplating as in electroless process.

It would be therefore desirable to have a metallization process that provides an efficient method for producing metal coating with strong adhesion to glass fiber, low stresses in the metallization layer and, at the same time, adequate thickness for subsequent soldering/welding and other technological procedures.

SUMMARY OF THE INVENTION

Accordingly, it is a principal object of the present invention to overcome the disadvantages associated with prior art metallization processes, by providing an improved method of producing high-quality metallized optical fiber with the required length at the required location along the fiber, which is able to be soldered and connected to mechanical components while reducing the level of stress in the coatings (metal on glass) and providing both good adhesion, conductivity and connectivity.

Because there is no single method answering all these requirements, the present invention combines two metallization techniques: vacuum evaporation without heating of the fiber, and electroless deposition. A thin metal layer, comprising an adhesion layer and a seed layer, is deposited by vacuum evaporation, providing superior adhesion and serving as a seed for the subsequent electroless deposition. The electroless layer provides the flexibility to apply any required metal thickness with low or negligible stress.

In accordance with a preferred method of the present invention, there is provided a method for the metallization of optical fibers, the method comprising the steps of;

evaporating a thin metal layer on the optical fiber, comprising an adhesion layer promoting adhesion to the optical fiber, and a seed layer; and applying metal to the seed layer by electroless deposition.

The inventive combination of evaporation and electroless processes allows the resulting adequately thick metallized layers to be low stress, or even stress free as well as strongly adhesive. The type of metals, metallization length, location along the fiber, as well as metallization thickness may vary between alternative applications.

Other features and advantages of the invention will become apparent from the following drawings and description.

BRIEF DESCRIPTION OF THE DRAWINGS

For a better understanding of the invention in regard to the embodiments thereof, reference is made to the accompanying drawings and description, in which like numerals designate corresponding elements or sections throughout, and in which:

FIG. 3 is a schematic illustration of the steps for the metallization process on local region using photoresist or any other polymer such as polyamide masking for bare fiber edge, performed in accordance with the principles of the present invention;

FIG. 5 is a schematic illustration of the steps for the metallization process on local regions using optical masking, performed in accordance with the principles of the present invention.

DETAILED DESCRIPTION OF THE PREFERRED EMBODIMENTS

The invention will now be described in connection with certain preferred embodiments with reference to the following illustrative figures so that it may be more fully understood.

In the embodiments described, the optical fiber to which the metallization is applied is the Single Mode Fiber (SMF) type, providing an optical fiber cable in which the signal or light propagates in a single mode or path. Since all light follows the same path, or travels the same distance, a transmitted pulse is not dispersed and does not interfere with adjacent pulses. SMF fibers can support longer distances and are limited mainly by the amount of attenuation. By contrast, there also exists multi-mode fiber (MMF).

Figure 1A:
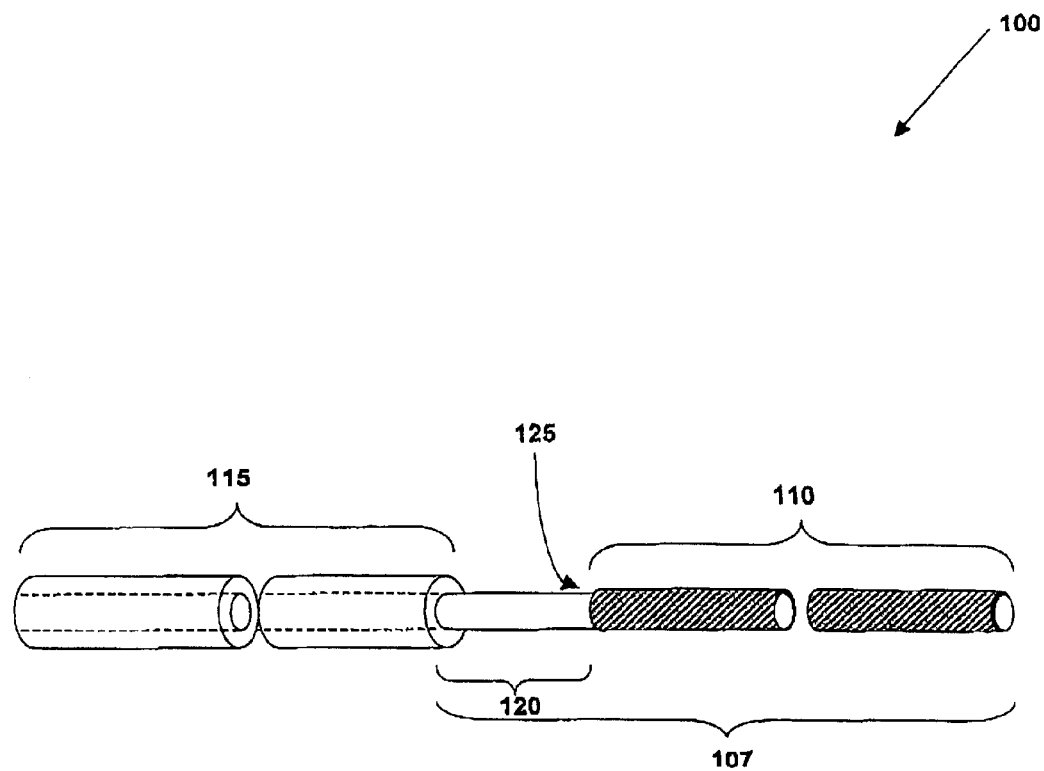
FIG. 1a is a schematic representation of an optical fiber, an end portion of which is metallized according to the principles of the present invention.

Referring now to FIG. 1a, there is shown a schematic representation of an optical fiber 100, an end-portion of which is metallized, according to the principles of the present invention. An improved method is illustrated for producing a high-quality coating of a metal layer with the required length, for example, nickel coated with gold, which can be soldered and connected to mechanical components, while reducing the level of stress in the coatings (metal on glass) and providing both good conductivity and connectivity. The partially metallized end-portion of optical fiber 100 includes a bare fiber portion 120, and a combined metallization portion 110, having an exemplary cross-section 125 as detailed in FIG. 1c herein below. A polymer jacketed portion 115 is also shown, wherein the polymer jacket is, for example, a 250 $\mu$m outer diameter acrylate coating. An exemplary bare fiber diameter is 125 $\mu$m (+/− 1 $\mu$m) and an exemplary stripped fiber length 107 is 25 mm+/− 5 mm. The optical fiber used, for example, is type SMF 28-200KPSI (BC# 13194). The coating thickness is preferably sufficient to allow hermetic sealing.

Figure 1B:
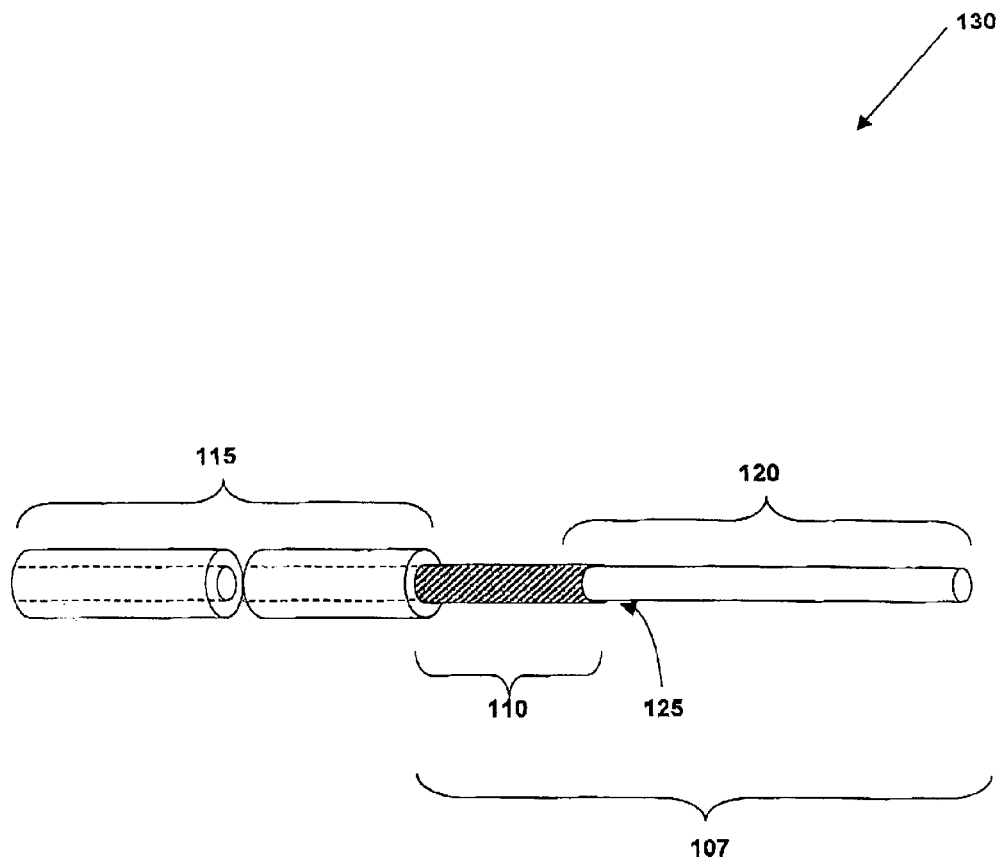
FIG. 1b is a schematic representation of an optical fiber, a mid-section portion of which is metallized according to the principles of the present invention.

FIG. 1b is a schematic representation of an optical fiber 130, a mid-section portion 110 of which is metallized. In accordance with the principles of the present invention, a masking process is used to achieve local metallization in selected portions of the optical fiber length.

As shown in FIG. 1b, partially metallized mid-section 110 of optical fiber 130 is between non-metallized portion 120, and a polymer jacketed portion 115, wherein the polymer jacket is, for example, a 250 $\mu$m acrylate coating. Metallization portion 110 has an exemplary cross-section 125 as detailed in FIG. 1c hereinbelow.

The masking process for local metallization of the optical fiber varies for different locations and lengths of metallization portions. The method involves selectively inhibiting the metallization process in selected areas.

To achieve masking, an organic polymer layer can be used to prevent metal deposition in selected areas. This layer can be photoresist, or a polyamide or any other kind of liquid polymer, which can be applied onto the fiber surface by dipping the fiber down to a desired masking length. An organic polymer coating, for example, usually needs curing (70–90 C. temperature treatment for about 1 hour). This coating can be partially removed by a standard exposing/developing or dissolving procedure, exposing bare optical fiber for the metallization procedure.

The masking method proceeds by coating the stripped optical fiber with photoresist defining the borders of the metallization area. All of the area below the photoresist level is completely protected from any metallization processing. When desired, the metallized areas can be separated by non-metallized areas (patterned metallization), and this is achieved by removing the photoresist on desired segments of the optical fiber, by a variety of methods. The advantage of this masking method is an opportunity to open one or more "windows" of bare glass. The photoresist can be removed, in the areas to be metallized, by exposure to suitable light.

Once the metallization procedure has been completed on the exposed areas, the metallization on the non-desired areas, which are still coated, is subsequently removed, together with the underlying organic polymer coating by a process known as "lift-off". Methods of removal of the metallized, non-desired areas utilize a dissolving step, using either a solvent, such as acetone, dimethylformamide, etc., or using hot sulfuric acid.

Figure 1C:
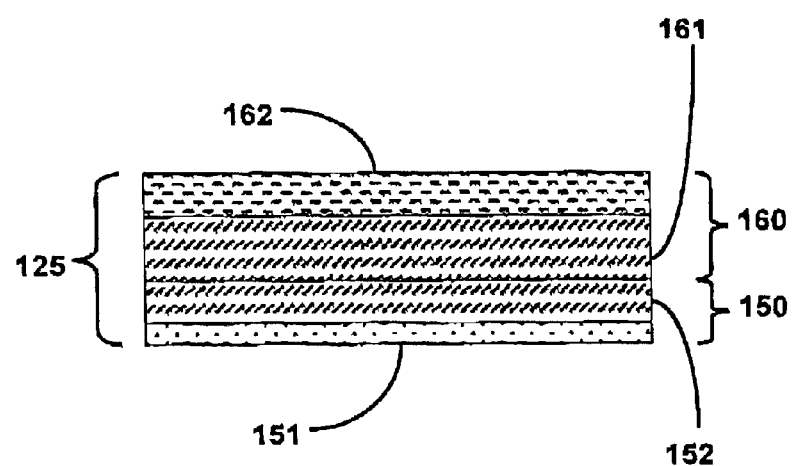
FIG. 1c is a detailed cross-section of an exemplary metallized layer applied to the optical fiber of FIGS. 1a and 1b, according to the principles of the present invention.

FIG. 1c is a detailed schematic representation of the exemplary cross-section 125 of the metallized layer on the surface of the optical fiber shown in FIGS. 1a and 1b, according to the principles of the present invention.

The process of metal coating of an optical fiber includes the steps of evaporation and electroless deposition. In a preferred embodiment, the metallization system of combined metallization portion has a cross-sectional covering 125 over bare fiber 120 which includes:

a physical evaporation layer 150 comprising NiCr (500A) 151 (adhesion layer)/Ni (1000A) 152 (seed layer), and an electroless deposition layer 160 comprising Ni (15000–17000 A) 161/Au(1000A) 162.

The preferred embodiment is based on e-beam evaporation of NiCr/Ni adhesion and seed layers and electroless deposition of 1.5 micron nickel metallization and finally a layer of 0.1 micron of gold, NiCr layer (500 A)/Ni (1000A) is used to enhance adhesion and to provide a seed for electroless deposition of a thick Ni layer. The outer layer of gold is used to avoid the oxidation of the nickel layer.

Alternatively, the seed layer can be Ti/Ni (titanium-nickel), Cr/Ni (chromium-nickel), or Co/Ni (cobalt-nickel).

Nickel becomes highly stressed when evaporated over a certain thickness, therefore evaporation alone cannot achieve the required thickness of the nickel layer. By combining the electroless process with the evaporation process in accordance with the inventive method, the resulting metallized layers are low stress, or even stress-free, while achieving the required thickness. Metallization length, location along the fiber, as well as metallization thickness and type may vary between alternative applications. Typical applications of metal-coated fibers can be for use as connecting fibers, and hermetic sealing of fibers.

Figure 2:
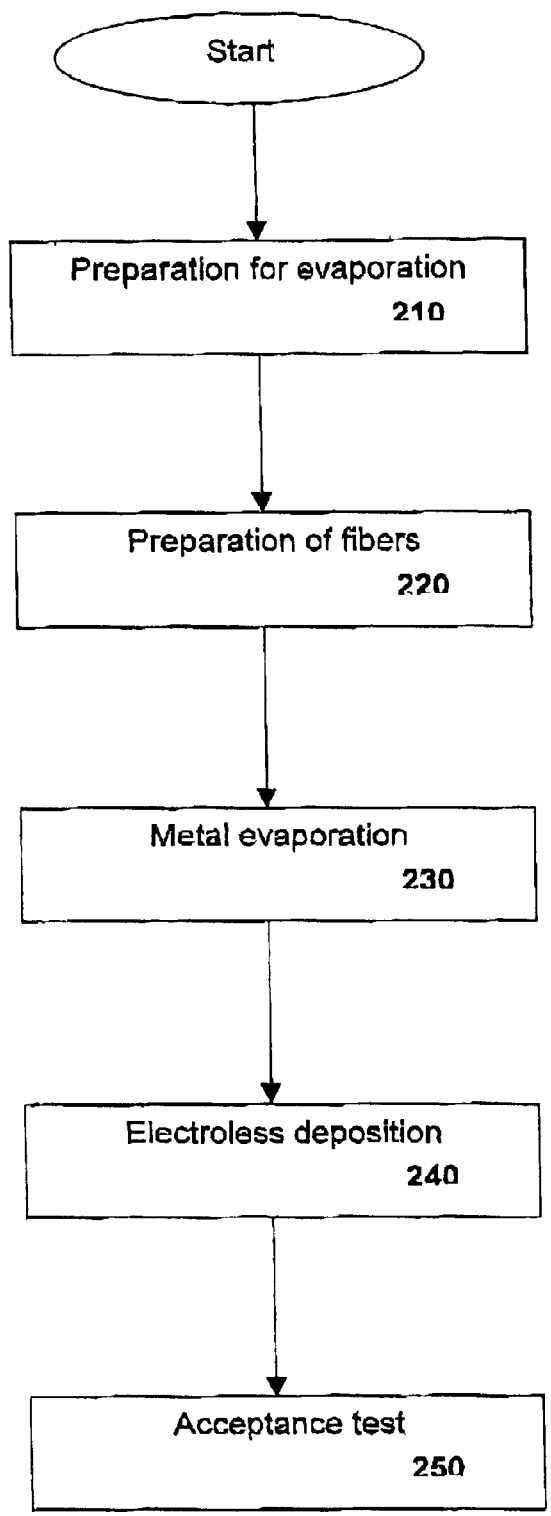
FIG. 2 is a flowchart of the steps for the metallization process, performed in accordance with the principles of the present invention.
Figure 4A:
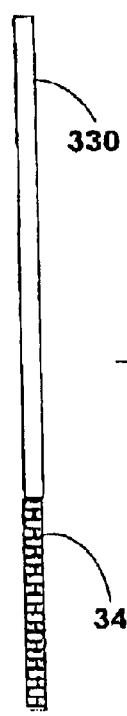
FIG. 4 is a schematic illustration of the steps for the metallization process on local regions for metallization separated by bare (non-metallized) fiber region using additional photoresist (polymer) etching, performed in accordance with the principles of the present invention.
Figure 4B:
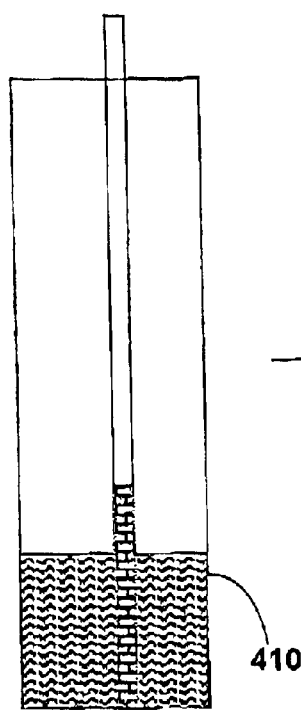
Figure 4C:
Figure 4D:
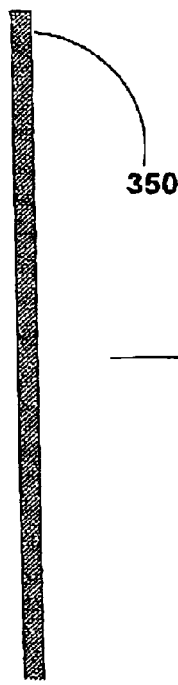
Figure 4E:
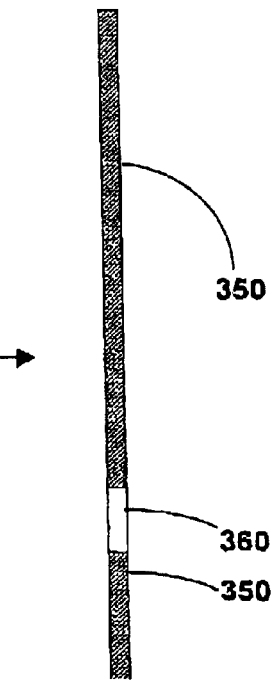

FIG. 2 is a flowchart of the steps for the metallization process, performed in accordance with the principles of the present invention. The method of metallization of optical fibers in accordance with the present invention, comprises the steps of preparation for evaporation, as in block 210, preparation of fibers, as in block 220, evaporation of a thin metal layer, comprising an adhesion layer, which promotes adhesion to glass fiber, and a seed layer, as in block 230; electroless plating deposition, including preparation of nickel and gold solutions, as in block 240; performing an acceptance test, as in block 250.

The optical fibers can be prepared to promote adhesion during metallization. The preparation of fibers as in block 220 comprises the steps of chemically cleaning the fiber surface, to obtain an optically clean surface.

The principal steps for the metallization of optical fibers are evaporation of a thin metal layer in the required location, comprising an adhesion layer, which promotes adhesion to glass fiber, and a seed layer, as in block 230, and electroless deposition, including preparation of metal salt solutions (e.g., nickel and gold), as in block 240.

FIG. 3 is a schematic illustration of the steps performed in accordance with the principles of the present invention, for the metallization process on a local region, using photoresist masking for the bare fiber edge. According to the present invention, the stripped edge of optical fiber 310 (FIG. 3a) is dipped into the photoresist solution 320 down to the border of the desired metallization region 325 (FIG. 3b). When fiber 310 is pulled out from solution 320, the region below the photoresist level is masked with a photoresist layer 340 and protected from any kind of metallization (FIG. 3c). The fiber with photoresist layer 340 is cured. After that, the metallization is applied to the fiber (to both masked 340 and unmasked 330 areas) (FIG. 3d). Metallization on the non-desired areas is removed subsequently together with the masking layer by dissolving the photoresist in acetone or other solvents in a "lift-off" process (FIG. 3e), resulting in a metallized area 350 and a non-metallized area 360.

FIG. 4 is a schematic illustration of the steps for an exemplary more complicated pattern, wherein metallized areas are separated by non-metallized areas, thus requiring additional masking/developing steps. In this alternative example the result is two metallization regions 360, which are separated by one bare fiber region 360. The process of FIG. 4 starts with the photoresist solution having already been applied to the fiber (FIG. 4a) as in FIGS. 3b–c, and therefore begins with masked area 340 and unmasked area 330. Then the lower part of photoresist is removed by dissolving in acetone 410 (FIG. 4b). The resulting fiber has two bare regions 330 separated by the masked area 340 (FIG. 4c). Subsequently, the metallization and lift-off steps are applied as in FIGS. 4d–e.

FIG. 5 illustrates another variation of the method for the metallization process on local regions using optical masking, constructed in accordance with the principles of the present invention. Again, initially a portion of the fiber is masked 340 and a portion unmasked 330. Masked fiber 340, covered with photoresist, is exposed to light 510 with an appropriate optical mask 515 (FIG. 5a). Then the fiber is dipped into developer solution 520 (FIG. 5b) wherein the areas exposed to light below optical mask 516 has the photoresist layer removed, resulting again in two bare regions 330 separated by the masked area 340 as shown in FIG. 5c. Then the metallization and lift-off steps are applied FIGS. 5d–e. This method is advantageous when a complicated pattern needs to be made on the fiber.

Having described the present invention with regard to certain specific embodiments thereof, it is to be understood that the description is not meant as a limitation, since further modifications may now suggest themselves to those skilled in the art, and it is intended to cover such modifications as fall within the scope of the appended claims. In particular, it should be noted that the reference to nickel and gold is just an example and any form of applicable metallization can be tailored to the above, improved process. Similarly, photoresist and polyamide are just examples for the masking material.

We claim:

1. A method for the metallization of an optical fiber comprising:
   physical vacuum evaporating a thin metal layer on the optical fiber without heating the fiber, said thin metal layer comprising an adhesion layer promoting adhesion to the optical fiber, and a seed layer; and
   applying metal to said seed layer by electroless deposition,
   wherein said metallization evaporating and applying activities are performed on a selected portion anywhere along the length of the optical fiber, thereby enabling patterned metallization.

2. The method of claim 1 wherein said adhesion layer is chosen from a group of metals comprising titanium, chromium cobalt and nickel.

3. The method of claim 1, wherein said electroless deposition metal comprises nickel and gold.

4. The method of claim 1 wherein said selected metallization portion is provided in a plurality of locations on the optical fiber in any combination with non-metallized portions.

5. The method of claim 1, further comprising introductory steps comprising:
   preparing a surface of said optical fiber by chemical cleaning to obtain an optically clean surface, for evaporation of said thin metal seed layer thereon; and
   preparing of fibers, including masking of fibers with organic material.

6. The method of claim 1, wherein the fiber is a single mode fiber.

7. The method of claim 1, wherein the fiber is a multimode fiber.

8. The method of claim 1, wherein the fiber is a polarization maintaining fiber.

9. The method of claim 1, wherein the fiber is any fiber.

10. A metallized optical fiber comprising:
    a thin metal layer evaporated on the optical fiber by physical vacuum evaporation, said thin metal layer comprising an adhesion layer promoting adhesion to the optical fiber, and a seed layer; and
    a thick metal layer applied to said seed layer by electroless deposition,
    wherein said evaporated and applied metal layers are located on a selected portion anywhere along the length of the optical fiber, providing patterned metallization.

11. The optical fiber of claim 10 wherein said adhesion layer is chosen from a group of metals comprising titanium, chromium cobalt and nickel.

12. The optical fiber of claim 10, wherein said electroless deposition metal comprises nickel and gold.

13. The optical fiber of claim 10 wherein said selected metallization portion is provided in a plurality of locations on the optical fiber in any combination with non-metallized portions.

14. The optical fiber of claim 10, wherein the fiber is a single mode fiber.

15. The optical fiber of claim 10, wherein the fiber is a multi-mode fiber.

16. The optical fiber of claim 10, wherein the fiber is a polarization maintaining fiber.

17. The optical fiber of claim 10, wherein the fiber is any fiber.

* * * * *